United States Patent
Ide et al.

Patent Number: 5,711,211
Date of Patent: Jan. 27, 1998

[54] CHLORINE GENERATOR FOR PRESERVATION OF FRUITS AND VEGETABLES

[75] Inventors: Paulina Aldunce Ide; Jessica Rodriguez Farias; Juan Pablo Zoffoli Guerra; Bernardo Latorre, all of Santiago, Chile

[73] Assignee: Embalajes Proem Limitada, Santiago, Chile

[21] Appl. No.: 792,250

[22] Filed: Jan. 31, 1997

[51] Int. Cl.⁶ ........................................ A23B 7/00
[52] U.S. Cl. ........................ 99/467; 99/485; 206/0.6; 206/205
[58] Field of Search ........................ 99/467–476, 481, 99/485; 53/432–434; 206/0.6, 205, 219–222; 422/29, 32, 40, 236, 305; 426/124, 118, 316, 319, 323, 418, 419; 428/74, 76

[56] References Cited

U.S. PATENT DOCUMENTS

| | | | |
|---|---|---|---|
| 4,094,119 | 6/1978 | Sullivan | 206/205 |
| 4,411,918 | 10/1983 | Cimino et al. | 53/432 X |
| 4,528,228 | 7/1985 | Clevenger | 426/419 X |
| 4,748,904 | 6/1988 | Razeto et al. | 99/467 |
| 5,028,443 | 7/1991 | Wade | 426/312 |
| 5,035,731 | 7/1991 | Spruill et al. | 206/204 |
| 5,100,016 | 3/1992 | Wischusen, III | 428/76 X |
| 5,165,947 | 11/1992 | Colucci et al. | 426/124 |
| 5,312,034 | 5/1994 | Nakagawa et al. | 426/419 X |
| 5,458,899 | 10/1995 | Floyd et al. | 426/419 X |
| 5,525,130 | 6/1996 | Beaudry | 424/443 |
| 5,556,658 | 9/1996 | Raudalus et al. | 426/419 X |
| 5,639,295 | 6/1997 | Wellinghoff et al. | 422/37 X |

*Primary Examiner*—Timothy F. Simone
*Attorney, Agent, or Firm*—Frost & Jacobs

[57] ABSTRACT

A chlorine generator for preserving fruits and vegetables includes a first layer of paper or polyethylene and a second layer of polyethylene. The first layer has a weight of from about 20 to about 70 $g/m^2$ and is preferably made from a laja-type paper. It is preferred that at least one surface of the first layer is coated with a plastic permeable film, such as polyethylene, having a weight of from about 5 to about 25 $g/m^2$. The two layers are joined together, preferably by thermal seal, to define one or more pockets. A hypochlorite material, such as calcium hypochlorite, is placed in the pockets. This material releases active chlorine gas upon reaction with moisture from said fruits and vegetables. Alternatively, the first layer can be impregnated with a mixture containing the hypochlorite (such as a mixture of hypochlorite and sodium chloride) and is preferably coated with a resin material.

20 Claims, 1 Drawing Sheet

CHLORINE GENERATOR FOR PRESERVATION OF FRUITS AND VEGETABLES

TECHNICAL FIELD

The present invention relates to the preservation of fruits and vegetables (i.e., produce). Specifically, it relates to a chlorine generator which is used for that purpose.

BACKGROUND OF THE INVENTION

As the fruits and vegetables consumed by city dwellers are being shipped from greater and greater distances, the need for effective preservative devices used during transportation and storage of produce is becoming more important.

It is known to use sulfur dioxide generators as preservatives when shipping grapes packaged in containers. The problem with this method is that the sulfur dioxide generated has a strong decolorizing effect on the grapes. The decolorizing of the grapes makes it difficult to market them to the consuming public.

It is also known to spray aqueous solutions of hypochlorites into the containers utilized for transport and handling of asparagus in order to provide a preservative effect. This technique is quite complex and difficult to implement effectively due to the need for tight controls on the aqueous concentrations of hypochlorite utilized. When the concentration of the hypochlorite is too high, the asparagus are attacked by the chemical and spoiled. Further, high concentrations of aqueous hypochlorite pose a corrosion problem in the metal containers used for cold storage and shipping of produce.

U.S. Pat. No. 2,071,625, Haas, et al., issued Feb. 23, 1937, is directed to a method for preserving packaged bakery products, particularly bakery products susceptible to the growth of microorganisms. The Haas, et al. patent discloses that the bakery product to be preserved is enveloped in a wrapping material which has been treated or impregnated with a harmless compound that liberates a germicidal gas, free chlorine. The material which generates the chlorine is preferably chlorazene or chloramine-T and dichloramine or dichloramine-T. This patent also discloses that hypochlorites of sodium, potassium and calcium may be used as sources of chlorine.

U.S. Pat. No. 4,094,119, Sullivan, issued Jun. 13, 1978, discloses a method of making a product used for dispensing volatile substances. The product includes a polypropylene backing layer, a nonwoven material forming a reservoir layer, and a microporous polypropylene layer covering the reservoir layer. All three of the layers are joined together around their peripheral edge portions. The reservoir layer stores and releases the volatile substance.

U.S. Pat. No. 4,411,918, Cimino, et al., issued Oct. 25, 1983, discloses an apparatus for preserving food by generating a preservative gas. The gas generating device comprises a basin-like main container and an auxiliary container located in the interior of the main container. The main container carries a solid chemical reagent. The auxiliary container carries a liquid chemical substance. The gas generating device is placed within a produce storage or transport receptacle. The preservative gas is generated when the main auxiliary container is pierced, allowing the liquid chemical substance to react with the solid chemical reagent. The preservative gases disclosed in this patent include carbon dioxide and sulfur dioxide.

U.S. Pat. No. 4,528,228, Clevenger, issued Jun. 9, 1985, discloses an atmospheric control cushioning pad for fruit. The pad comprises an upper and a lower sheet, which are joined together at their peripheral edges, and a cushioning material which is enclosed between the upper and lower sheets. The cushioning material may include a chemical composition, such as calcium hydroxide which absorbs carbon dioxide, or potassium permanganate which oxidizes ethylene. Calcium chloride is also suggested because it absorbs water and assists in the cushioning function of the pad by expanding.

U.S. Pat. No. 4,748,904, Raseto, et al., issued Jun. 7, 1988, discloses a multi-layer paper structure used for preserving fruits and vegetables during storage and transport. The structure contains at least two, and preferably three, layers of paper which are joined together to form a pocket. At least one of the paper layers is coated with a permeable film, such as polyethylene. The pocket contains a hypochlorite material. The patent teaches that moisture from the fruit diffuses through the outside layers where it reacts with the hypochlorite to form a chlorine gas which diffuses back out and acts as a preservative for the fruit. Chile Patent 35760, Raseto, issued Nov. 3, 1987, discloses a similar paper-based chlorine generator for preserving fruit.

SUMMARY OF THE INVENTION

The present invention is directed to a chlorine generator used for preserving fruits and vegetables. The generator includes a first layer consisting of paper or polyethylene which is moisture and gas permeable and which has a weight of from about 20 to about 70 $g/m^2$ (preferably coated with polyethylene having a weight of from about 5 to about 25 $g/m^2$) and a second layer consisting of polyethylene having a weight of from about 25 to about 70 $g/m^2$ and a thickness of from about 10 to about 17 microns. These layers are joined together by one or more bonds such that they form at least one pocket between them. Contained within that pocket is a hypochlorite material which releases active chlorine gas upon reaction with moisture from the fruits and vegetables being preserved.

The first layer is preferably paper and, more preferably, is made of a laja-type paper. The second layer is preferably a micropunctured polyethylene film. The bonds between these two layers are preferably thermal seals.

The preferred embodiment of this invention has been found to be particularly effective in the control of Botrytis Cinerea in grapes. Grapes which are stored in conventional boxes and maintained at about 0° C. for 35 or more days with the chlorine generators of the present invention show effective preservation with no side effects, such as decoloration, browning, or dehydration.

As used herein, all percentages and ratios are "by weight" unless otherwise specified.

DESCRIPTION OF THE DRAWINGS

For the purpose of illustrating the present invention, there is shown in the drawings a preferred embodiment. However, it is understood that the present invention is not limited to this specific embodiment and that variations which would have been obvious to one skilled in the art, based on the disclosure herein, fall within the scope of the present invention.

DETAILED DESCRIPTION OF THE INVENTION

Figure 1:
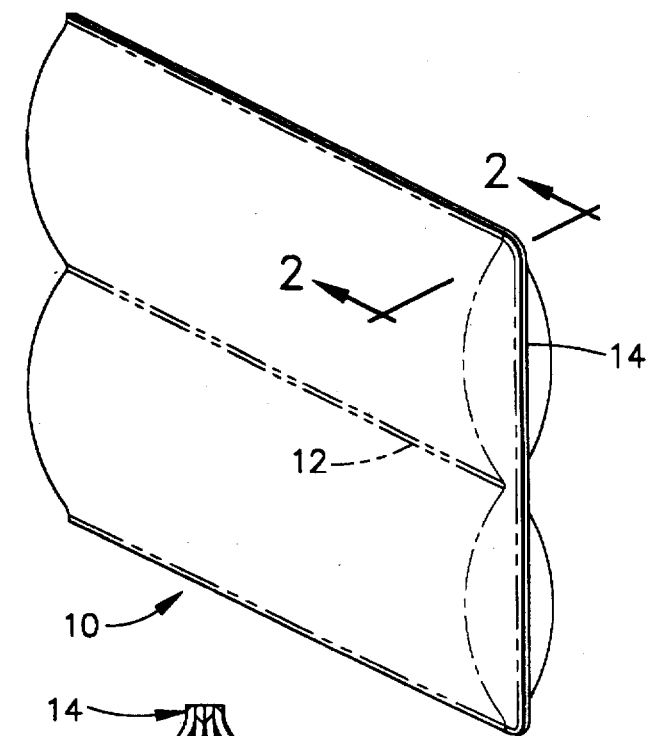
FIG. 1 is an isometric view of a preferred embodiment of the present invention.
Figure 2:
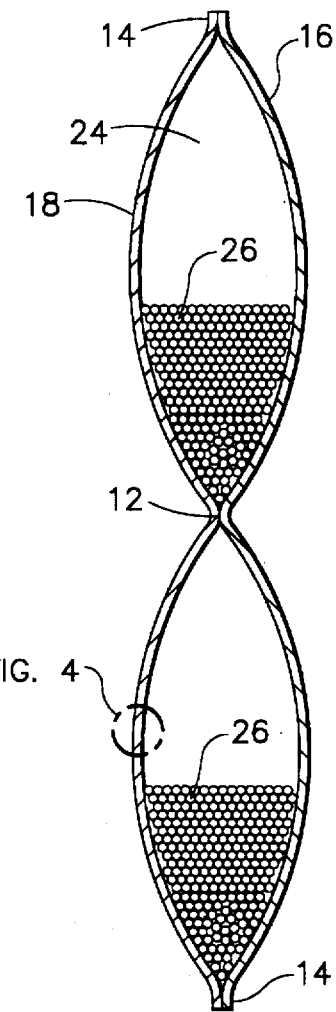
FIG. 2 is a sectional view of the preferred embodiment shown in FIG. 1 taken along sectional lines 2—2.
Figure 4:
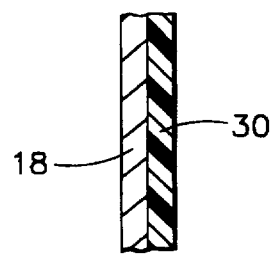
FIG. 4 is an enlarged cross-sectional view of a portion of the present invention, the location being noted in FIG. 2.

Referring to the drawings, wherein like numerals indicate like elements, there is shown in FIGS. 1 and 2 a first embodiment of the chlorine generator of the present invention (10). The generator (10) of the present invention generally comprises a first (18) and a second (16) layer. The first layer is made from a paper or polyethylene (as described below) which is permeable to moisture and gas and which has a weight of from about 20 to about 70 g/m$^2$, preferably from about 20 to about 40 g/m$^2$, and most preferably about 30 g/m$^2$. This layer is preferably paper and is more preferably made from laja-type paper which is made from the fibers of the sisal (agave sisalana plant), although other paper-based materials may be used. It is preferred that, when the first layer is made from paper, one surface of this first layer (18) be coated with a plastic film (30) having a weight of between about 5 to about 25 g/m$^2$, preferably from about 10 to about 20 g/m$^2$, and most preferably about 12 g/m$^2$. See FIG. 4. Useful plastic materials include, for example, polyethylene. Even after coating, the first layer must remain permeable to moisture and gas. The coating may be on either or both sides of the first layer, although coating on a single side is preferred.

The second layer (16) of the chlorine generator (which should be both moisture and gas permeable) is made from a polyethylene material having a weight of from about 25 to about 70 g/m$^2$, preferably from about 30 to about 55 g/m$^2$, and having a thickness of from about 10 to about 17 microns, preferably from about 12 to about 15 microns. A preferred material is a high density non-woven polyethylene film which is preferably micropunctured and is, therefore, permeable to both moisture and gas. The polyethylene can also be used in the form of a woven tissue, such as Tyvek, commercially available from duPont.

The layers are joined together, preferably around their peripheral edges by a seal, preferably a thermal seal (14). Such seals are well known in the art. Alternatively, the thermal seal can be replaced by gluing, sewing or any other means suitable for joining or binding the layers together and which will prevent any leakage of material from between the layers. The sealing of the layers, therefore, provides at least one pocket in the chlorine generator which is used to hold the hypochlorite material described below. On the interior of the chlorine generator (10) there may be provided a plurality of thermal (or other types of) seals (12). These seals (12) are identical to those described with relation to the peripheral seals (14). The interior seals (12) join the layers at the inner regions of the generator thereby forming a plurality of pockets. The combination of seals (12) and (14) and the layers (16) and (18) define pockets (24). See FIGS. 2 and 3. Pocket (24) is located between the two layers (16) and (18) which make up the present invention. By appropriate use and positioning of the seals, a plurality of such pockets having the same or different sizes may be formed.

A chlorine-generating composition (26) is placed in one or more of the pockets. This composition comprises a hypochlorite material and may optionally include adjunct components. Preferably, the chlorine generator contains a total of from about 1 to about 20 grams of chlorine-generating composition. This total amount then is divided up between the various pockets contained in the chlorine generator. The hypochlorite material used in the composition is generally either in granulated or powder form. It is generally of a commercial grade which is not absolutely pure. It is preferred that the hypochlorite material be an alkaline earth or alkalai metal hypochlorite, with calcium hypochlorite being preferred. Of course, it is apparent to those skilled in the art that any hypochlorite material which is capable of releasing chlorine upon reaction with moisture would be suitable for use in the present invention. The chlorine-generating composition may additionally contain sodium chloride. Such a composition generally comprises from about 30% to about 100% of the mixture of calcium hypochlorite and sodium chloride. It is preferred that the weight ratio of hypochlorite material to sodium chloride be from about 1:1 to about 1.5:1. The diffusion characteristics of either first layer (18) or second layer (16) can be varied both in terms of moisture diffusion into the chlorine generator and chlorine gas diffusion out of the generator in order to meet the particular needs of the type of fruit or the type or size of container in which the chlorine generator is utilized.

In an alternate structure, either the second layer (16) or, preferably, the first layer (18) is impregnated with a composition containing the hypochlorite material, or the hypochlorite material together with additional adjunct components such as sodium chloride, citric acid and/or calcium chloride. This impregnated layer may be coated with a resin material such as a vinyl resinous substance (e.g., polyvinyl acetate, polyvinvyl alcohol), an elastomer (e.g., natural rubber butadiene-acylonitrile copolymer), a wax (e.g., paraffin), or other materials, such as gelatin or starch, as well as mixtures of such materials.

In addition to the hypochlorite material and the optional sodium chloride, additional materials may be included in the chlorine-generating composition. The inclusion or exclusion of such additional materials can have the effect of slowing down or speeding up the rate at which the chlorine is generated. For example, the inclusion of citric acid in the composition (such that the final composition contains from about 10% to about 60% citric acid, together with from about 10% to about 70% hypochlorite and from about 10% to about 60% sodium chloride) and calcium chloride (such that the final composition contains from about 0.5% to about 10% calcium chloride) tends to increase the speed at which the chlorine is generated. Further, the size and configuration of the chlorine generator of the present invention can be varied based on the type of fruit to be treated and the type and size of the container utilized. For example, the overall size of the generator can be increased or decreased depending on the amount of chlorine which is needed to accomplish the preservation task in a particular instance. Also, the formula and amount of hypochlorite composition, as well as the number of pockets included in the chlorine generator, the permeability of the pockets and the amount of chlorine-generating composition in each pocket can be varied.

Figure 3:
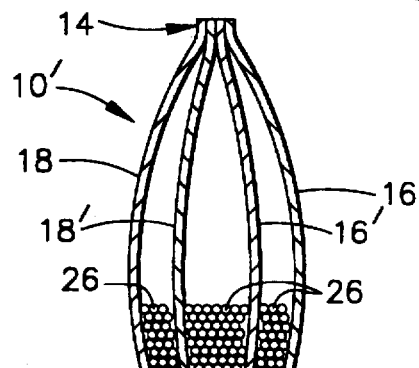
FIG. 3 is a sectional view of another embodiment of the present invention.
Figure 3:
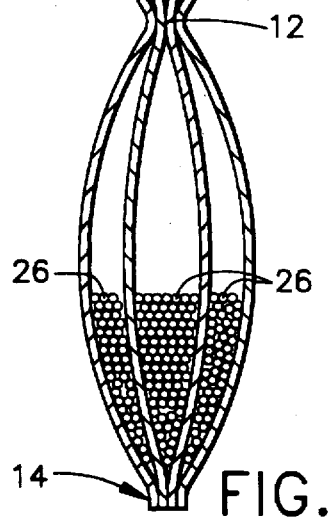

A second embodiment of this invention (10') is shown in FIG. 3. The generator (10') consists of a first (18) and second (16) layer which are identical to those described in the previous embodiment. In addition to those layers, this alternative embodiment includes an additional first (18') and/or second (16') layer which are sandwiched between the original first and second layers. Thus, this alternate structure includes a multi-layer sandwich of pockets in which the chlorine-generating composition may be contained. Once again, this type of structure allows for greater control of the amount and rate of the chlorine gas which is generated from the present invention. Pockets are formed in this sandwich structure by conventional seals, such as thermal seals, or others, as described above. Chlorine-generating composition is placed within one or more of the pockets; preferred structures contain chlorine-generating composition in each pocket.

In use, the present invention is packed in a container with fruits and/or vegetables. The invention can be placed in the fruit or vegetable container before or after the produce is placed in the container. The moisture from the produce reacts with the hypochlorite material forming chlorine gas which acts as a preservative.

The following examples illustrate the present invention.

EXAMPLE 1

The generator consists of two layers, one of micropunctured polyethylene, thickness about 12 to 15 microns and weight about 40 g/m$^2$, and the other laja-type paper, weight about 30 g/m$^2$, coated with polyethylene, weight about 12 g/m$^2$. These layers are joined together around their peripheral edges and at other points by thermal seal. The combination of the thermal seals and the layers define six pockets of equal size. The outside dimensions of the generator is 46 cm long and 20.5 cm wide. The formulation of the chlorine-generating composition used is as follows:

| | |
|---|---|
| Calcium Hypochlorite (commercial grade material) | 3.5 g |
| Sodium Chloride | 1.9 g |
| Citric Acid | 4.0 g |
| Calcium Chloride | 0.2 g |

The quantity of formulation (mix of compounds) per unit of the generator is 9.6 g.

The quantity per pocket is 1.6 g.

This generator produces chlorine gas at a relatively fast rate and effectively preserves fruit (e.g., grapes) when placed with them in a shipping container.

EXAMPLE 2

The generator consists of two layers, one of micropunctured polyethylene, thickness about 12 to 15 microns and weight 40 g/m$^2$, and the other laja-type paper, weight about 30 g/m$^2$, coated with polyethylene, weight about 12 g/m$^2$. These layers are joined together around their peripheral edges and at other points by thermal seal. The combination of the thermal seals and the layers define six pockets of equal size. The outside dimensions of the generator is 46 cm long and 20.5 cm wide. The formulation of the chlorine-generating composition used placed in each pocket is as follows:

| | |
|---|---|
| Calcium Hypochlorite (commercial grade material) | 1.2 g |
| Sodium Chloride | 0.6 g |

The quantity of formulation (mix of compounds) per unit of the generator is 1.8 g.

The quantity per pocket is 0.3 g.

57123747.001

This generator produces chlorine gas at a rate slower relative to the generator of Example 1. It effectively preserves fruit (e. g., grapes) when placed with them in a shipping container.

The present invention may be embodied in other specific forms without departing from the spirit or essential attributes of the present invention.

What we claim is:

1. A chlorine generator for preserving produce comprising:
   (a) a first layer consisting of paper or polyethylene which is permeable to moisture and gas and which has a weight of from about 20 to about 70 g/m$^2$;
   (b) a second layer consisting of polyethylene having a weight of from about 25 to about 70 g/m$^2$ and a thickness of from about 10 to about 17 microns, one or more bonds joining together said layers such that at least one pocket is formed between them; and
   (c) a chlorine-generating composition comprising a hypochlorite material being disposed in said pocket, said hypochlorite material releasing active chlorine gas upon reaction with moisture from said produce.

2. The chlorine generator according to claim 1 wherein said first layer is made from paper.

3. The chlorine generator according to claim 2 wherein said second layer is made from a micropunctured polyethylene film.

4. The chlorine generator according to claim 2 wherein said hypochlorite material is an alkaline earth or alkalai metal hypochlorite.

5. The chlorine generator according to claim 4 wherein said hypochlorite material is calcium hypochlorite.

6. The chlorine generator according to claim 2 wherein the first layer is made from a laja-type paper.

7. The chlorine generator according to claim 2 wherein at least one surface of said first layer is coated with a permeable film, said film having a weight of from about 5 to about 25 g/m$^2$.

8. The chlorine generator according to claim 7 wherein said permeable film is polyethylene.

9. The chlorine generator according to claim 2 wherein the weight of said first layer is from about 20 to about 40 g/m$^2$.

10. The chlorine generator according to claim 2 wherein said second layer has a weight of from about 30 to about 55 g/m$^2$ and a thickness of from about 12 to about 15 microns.

11. The chlorine generator according to claim 2 wherein the chlorine-generating composition comprises from about 30% to about 100% calcium hypochlorite and sodium chloride wherein the ratio of calcium hypochlorite to sodium chloride is from about 1:1 to about 1.5:1.

12. The chlorine generator according to claim 11 wherein the hypochlorite mixture further comprises from about 10% to about 60% citric acid and from about 0.5% to about 10% calcium chloride.

13. The chlorine generator according to claim 2 which contains from about 1 to about 20 grams of said chlorine-generating composition.

14. The chlorine generator according to claim 11 wherein said first layer is impregnated with a mixture comprising calcium hypochlorite and sodium chloride.

15. The chlorine generator according to claim 14 wherein said first layer is further coated with a resin selected from the group consisting of vinyl resinous substances, elastomers, waxes, gelatin and starch, such coating permitting the release of chlorine upon reaction of the hypochlorite material with moisture from said produce.

16. The chlorine generator according to claim 15 wherein the resin is selected from the group consisting of polyvinyl acetate, polyvinyl alcohol, natural rubber, butadiene-acrylonitrile copolymer, paraffin, gelatin, starch and mixtures thereof.

17. A chlorine generator for preserving produce comprising:

(a) a first layer consisting of laja-type paper which is permeable to moisture and gas and which has a weight of from about 20 to about 70 g/m$^2$;

(b) a second layer consisting of micropunctured polyethylene having a weight of from about 25 to about 70 g/m$^2$ and a thickness of from about 10 to about 17 microns, one or more bonds joining together said layers such that at least one pocket is formed between them; and (c) a chlorine-generating composition comprising an alkaline earth or alkalai metal hypochlorite and sodium chloride, wherein the weight ratio of hypochlorite to sodium chloride is from about 1:1 to about 1.5:1, said mixture being disposed in said pocket, and said hypochlorite material releasing active chlorine gas upon reaction with moisture from said produce.

18. The chlorine generator according to claim 17 wherein said hypochlorite is calcium hypochlorite.

19. The chlorine generator according to claim 18 wherein at least one surface of said first layer is coated with a permeable polyethylene film, said film having a weight of from about 5 to about 25 g/m$^2$.

20. The chlorine generator according to claim 19 wherein said first layer has a weight of from about 20 to about 40 g/m$^2$, and said second layer has a weight of from about 30 to about 55 g/m$^2$ and a thickness of from about 12 to about 15 microns.

* * * * *